United States Patent [19]

Bennett

[11] Patent Number: 4,577,819

[45] Date of Patent: Mar. 25, 1986

[54] SELF-BALANCING BOOM APPARATUS

[76] Inventor: Richard C. Bennett, 7333 Armitage Ave., Elmwood Park, Ill. 60635

[21] Appl. No.: 610,127

[22] Filed: May 14, 1984

[51] Int. Cl.$^4$ ............................................. F16L 3/00
[52] U.S. Cl. ................................ 248/123.1; 248/571; 248/292.1; 248/280.1
[58] Field of Search ............... 248/571, 201, 292.1, 248/280.1, 123.1, 578

[56] References Cited

U.S. PATENT DOCUMENTS

| | | | |
|---|---|---|---|
| 1,319,792 | 10/1919 | Phorson | 248/123.1 |
| 2,157,877 | 3/1939 | Walker | 248/123.1 |
| 2,179,357 | 11/1939 | Stava . | |
| 2,547,532 | 4/1951 | Mendelsohn . | |
| 3,603,553 | 9/1971 | Doerner | 248/578 |
| 4,221,353 | 9/1980 | Kuhn | 248/292.1 |
| 4,235,405 | 11/1980 | Carey | 248/123.1 |
| 4,277,044 | 7/1981 | Hamilton | 248/123.1 |
| 4,383,455 | 5/1983 | Tuda et al. . | |

Primary Examiner—Reinaldo P. Machado
Assistant Examiner—Alvin Chin-Shue
Attorney, Agent, or Firm—Emrich & Dithmar

[57] ABSTRACT

A self-balancing boom apparatus includes a vertical support post, a boom pivotally mounted to the support post, and a spring which produces a force along a force axis to counteract gravitational forces on the boom. A spring force coupling mechanism couples the spring force to the boom at a point between the pivot axis and the distal end of the boom. The spring force coupling mechanism is constructed and arranged for vertical movement on the support post, causing the spring force to vary as the boom is pivoted. The force coupling mechanism includes a pair of horizontally extending cam members engaged by a pair of rollers which are attached to the boom and moved to vary the distance between the force axis and the point of application of the force inversely with variation in the spring force as the boom is pivoted.

22 Claims, 8 Drawing Figures

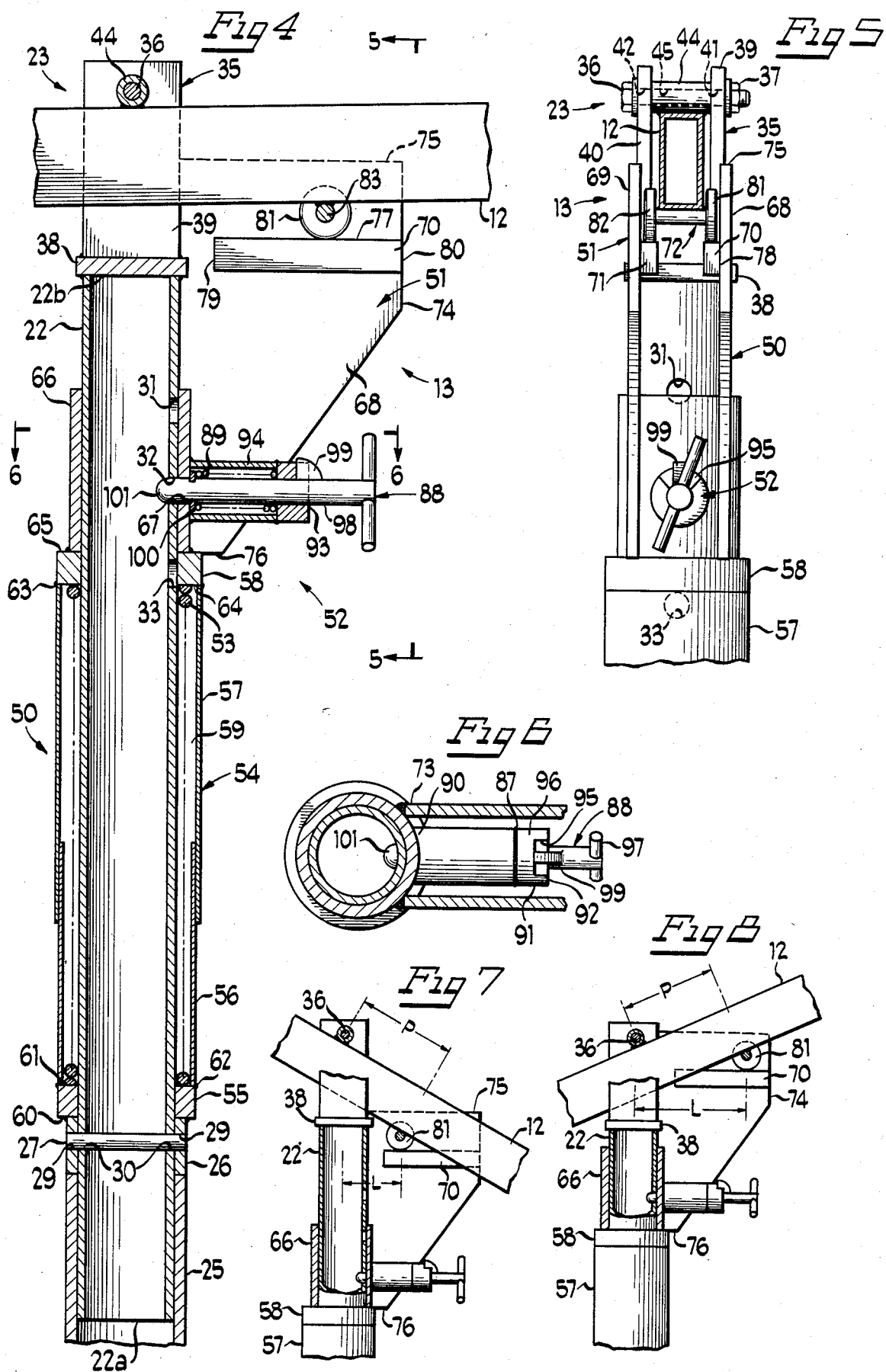

SELF-BALANCING BOOM APPARATUS

BACKGROUND OF THE INVENTION

This invention relates to an adjustable boom apparatus for supporting equipment, and in particular a spring biased self-balancing boom apparatus which compensates for spring force variation during adjustment of the boom.

Booms are used for mounting equipment to extend the useful range of the equipment over a greater area and to increase maneuverability and operator convenience in using the equipment. Conventionally, booms are counterbalanced by a mechanism which includes a spring attached to the proximal end of the boom, behind its pivot point. The counterbalancing mechanism counteracts the gravitational force on the boom and the equipment carried on the end of the boom. The spring of the counterbalancing mechanism is caused to retract or extend as the distal end of the boom is raised or lowered during boom adjustment. Most known counterbalancing arrangements rely on friction braking or other such means to maintain desired positions of boom adjustment. Such arrangements are characterized by jerky or otherwise uneven arm adjustments during positioning of the equipment.

One spring counterbalancing arrangement for an equipment support boom, depicted in U.S. Pat. No. 4,277,044, alleviates these problems by providing automatic compensation for inherent variations of spring extension forces which occur during adjustment of the boom. In this arrangement, the spring has one of its ends connected to the base which supports the boom and its other end attached to the boom by a mechanism which is adapted to alter the arm length-to-moment ratio and spring force angle according to variations in spring extension forces. To this end, the mechanism includes a first cam and a first follower constructed and arranged to effect extension of the spring when the distal end of the boom is lowered and vice versa, and a second cam and follower constructed and arranged to simultaneously move the opposite end of the spring toward the location of proximal pivoting of the arm when the distal end of the arm is lowered and vice versa.

In this arrangement, achieving compensation for spring extension forces requires a cam of a particular configuration providing a non-linear cam surface to effect requisite repositioning of one end of the spring relative to the pivot axis for the boom as the position of the boom is adjusted. Because the cam directs the repositioning of the end of the spring during adjustment of the boom, the degree of uniformity in compensation over the entire excursion of the boom is dependent upon manufacturing tolerances of the non-linear cam.

Moreover, this arrangement requires that the spring be pivoted about an axis as it is being extended or allowed to retract. Such spring movement increases wear and tear on the spring, and the spring could eventually break. The spring is attached to the boom at the back end thereof, behind the pivot point, and is normally maintained in tension. Thus, if the spring should break, the boom will drop, damaging the equipment it is carrying and possibly causing injury to a person working beneath the boom. Although this problem could be alleviated by using several springs, breakage of one of the springs could result in increased forces on the other springs, causing a chain reaction with other springs breaking and the boom dropping.

SUMMARY OF THE INVENTION

It is an object of the present invention to provide a self-balancing boom apparatus which is fully balanced for ease of movement vertically and horizontally and which has the ability to stay at virtually any selected inclination to which it is adjusted.

Another object of the invention is to provide a self-balancing boom apparatus employing spring counterbalancing.

Another object of the invention is to provide a self-balancing boom apparatus which is characterized by ease of maintenance and assembly, which is of rugged construction and which will sustain continuous use.

In accordance with the invention, there is provided a self-balancing boom apparatus comprising a vertically extending support member, a boom pivotally mounted near its proximal end to the support member for movement about a pivot axis and adapted to carry equipment at its distal end, and balancing means for counteracting downward force at the distal end of the boom and including spring means and spring force coupling means, the spring means being carried by the support member and producing a force which is directed along a force axis, the spring force coupling means being constructed and arranged to apply the spring force to the boom at a point located between the pivot axis and the distal end of said boom, and to maintain substantially constant the force exerted on the boom by the spring as the boom is pivoted.

In accordance with one aspect of the invention, the spring force coupling means includes a cam member and a cam follower, the cam member being coupled to the spring means and defining a cam surface, the cam follower being fixed to the boom at the point of application of the spring force and engaging the cam surface, the cam member being movable relative to the support member as the boom is pivoted to vary the force produced by the spring along the force axis while cooperating with the cam follower to vary the distance between the force axis and the point of application of the spring force to the boom, whereby the force exerted on the boom by the spring means is maintained substantially constant as the boom is pivoted.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 4 is an enlarged view, partially in section, of a portion of a support post of the boom apparatus, a fragmentary portion of the boom, and the counterbalancing mechanism of the boom apparatus;

FIG. 5 is a view in vertical section taken along the line 5—5 of FIG. 4;

FIG. 6 is a view in horizontal section taken along the line 6—6 of FIG. 4; and

FIGS. 7 and 8 are fragmentary views of the boom and support, depicting the boom in lowered and raised positions, respectively, relative to a horizontal position.

DETAILED DESCRIPTION OF THE PREFERRED EMBODIMENT

Figure 1:
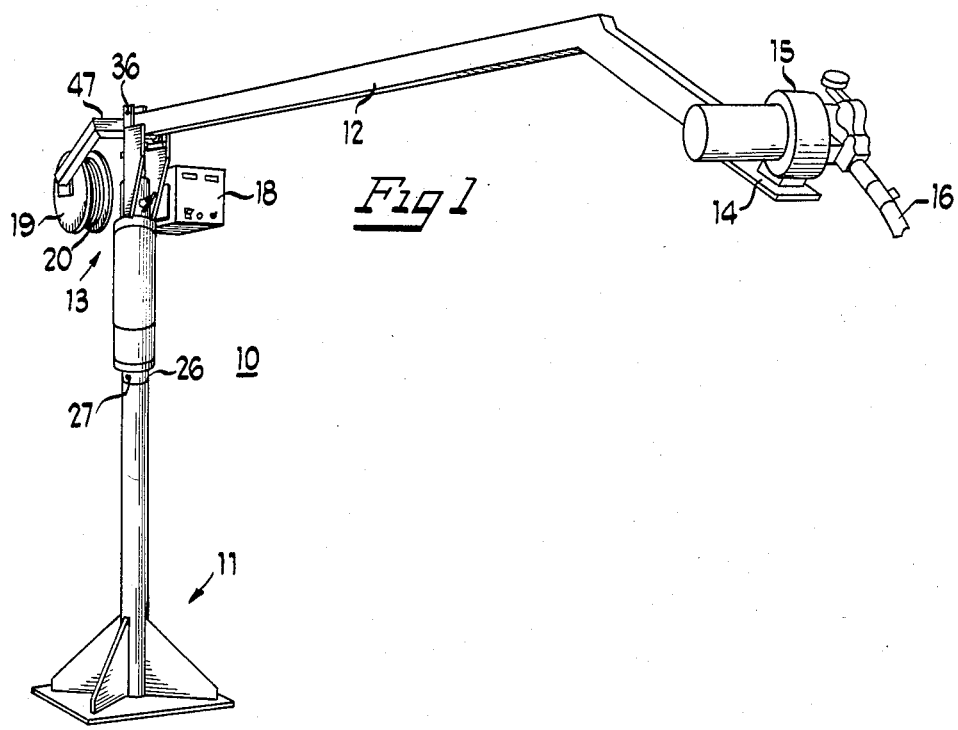
FIG. 1 is a perspective view of a self-balancing boom apparatus incorporating the features of the present invention.

Referring to FIG. 1, there is shown a self-balancing boom apparatus generally designated by the numeral 10 constructed in accordance with and embodying the features of the present invention. The boom apparatus 10 includes a floor stand 11, a boom 12 and a balancing mechanism designated by the reference numeral 13. The boom 12 is pivotally and rotatably mounted to the floor stand 11, and the balancing mechanism 13 enables adjustment of the position of the boom 12 with ease and maintains the boom 12 and equipment carried thereby at any selected inclination to which it is adjusted.

The boom apparatus 10 is described with reference to a particular application for supporting welding equipment. In this application, a support structure 14, which is mounted at the distal end 12b of the boom 12, carries welding equipment including a motor and wire feed unit 15 and a cable 16 which is connected to a welding torch (not shown). A high voltage source 18 is mounted on the floor stand 11. A wire feed spool 19 for welding wire 20 is carried by the boom 12 at its proximal end 12a. In use, the stand 11 is located in the middle of an area having items to be welded, and the boom 12, which is rotatably and pivotally mounted to the stand 11, allows the welder to move around the area, positioning the welding equipment at the most advantageous location.

Figure 2:
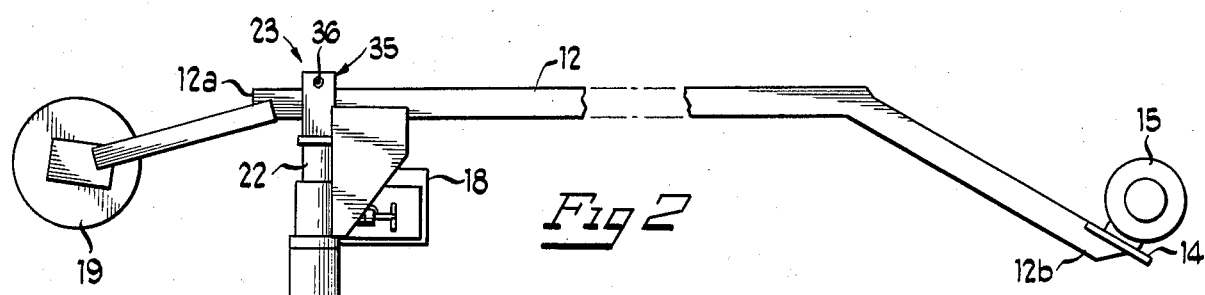
FIG. 2 is a fragmented side elevation view of the boom apparatus shown in FIG. 1.

Considering the boom apparatus 10 in more detail, with reference to FIGS. 2 and 4, the floor stand 11 is comprised of a base assembly 21, a support post 22 and a boom mount assembly 23. The base assembly 21 includes a flat base plate 24, a vertically extending tube 25, a rotatable support post mount defined by a mounting sleeve 26 and a locking pin 27, and a plurality of gussets 28. Diametrically opposed mounting holes 29 are provided in the mounting sleeve 26 which is mounted on the top edge of the open ended tube 25 and rotatable relative thereto. The mounting sleeve 26 has inner and outer diameters corresponding to those of the tube 25.

The tube 25 has its bottom end welded to the upper surface of the base plate 24. The gussets 28 are welded to the base plate 24 and the tube 25, adding rigidity to the base assembly 21. The base assembly 21 may be anchored to the floor, or may be mounted on a cart to allow the boom apparatus 10 to be relocated as desired.

Referring to FIG. 4, the support post 22 has a lower end 22a, and an upper end 22b. A pair of mounting holes 30 are located near its lower end 22a and aligned in diametrically opposed positions. The support post 22 is also provided with a set of three apertures 31, 32 and 33 which are located in vertical alignment near the upper end 22b of the support post 22. The outer diameter of the support post 22 is slightly less than the inner diameter of the mounting sleeve 26 and the tube 25.

The support post 22 is mounted on the base assembly 21 with the lower end 22a of the support post 22 extending through the mounting sleeve 26 into the open end of the tube 25 as shown in FIG. 4. Mounting holes 30 of support post 22 are aligned with mounting holes 29 of the mounting sleeve 26, and the locking pin 27 extends through the mounting holes 29 and 30. The locking pin 27 locks the support post 22 to the mounting sleeve 26 and suspends the support post 22 vertically within the tube 25, permitting 360° rotation of the support post 22 with sleeve 26, relative to the tube 25.

Referring to FIGS. 4 and 5, the boom mount assembly 23 is comprised of a mounting bracket 35 and a fastener embodied as a bolt 36 and a nut 37. The mounting bracket 35 is U-shaped, having a base member 38 and two side members 39 and 40 which extend upwardly, in a parallel spaced relationship perpendicular to the base member 38. The side members 39 and 40 are rectangular in shape and have respective mounting holes 41 and 42, which are aligned with one another at the same height above the base member 38 and are of a diameter corresponding to the diameter of the shank of the bolt 36 which defines the pivot axis for the boom 12.

The base member 38 of the mounting bracket 35 is welded to the top of the support post 22. The side members 39 and 40 are welded to the base member 38 and are spaced apart a distance corresponding generally to the width of the boom 12 as shown in FIG. 5.

Referring to FIGS. 2 and 5, the boom 12 is a channel member of rectangular cross-section (FIG. 5) of a length in the order of twelve feet from its proximal end 12a to its distal end 12b. The boom 12 extends generally horizontally, but is inclined downwardly at an oblique angle from a point near its distal end 12b. A mounting bushing 44 is welded to the top surface of the boom 12 near its proximal end 12a. In the exemplary embodiment, the mounting bushing 44 is located approximately seven inches from the proximal end 12a. The mounting bushing 44 has an axial bore 45.

Figure 3:
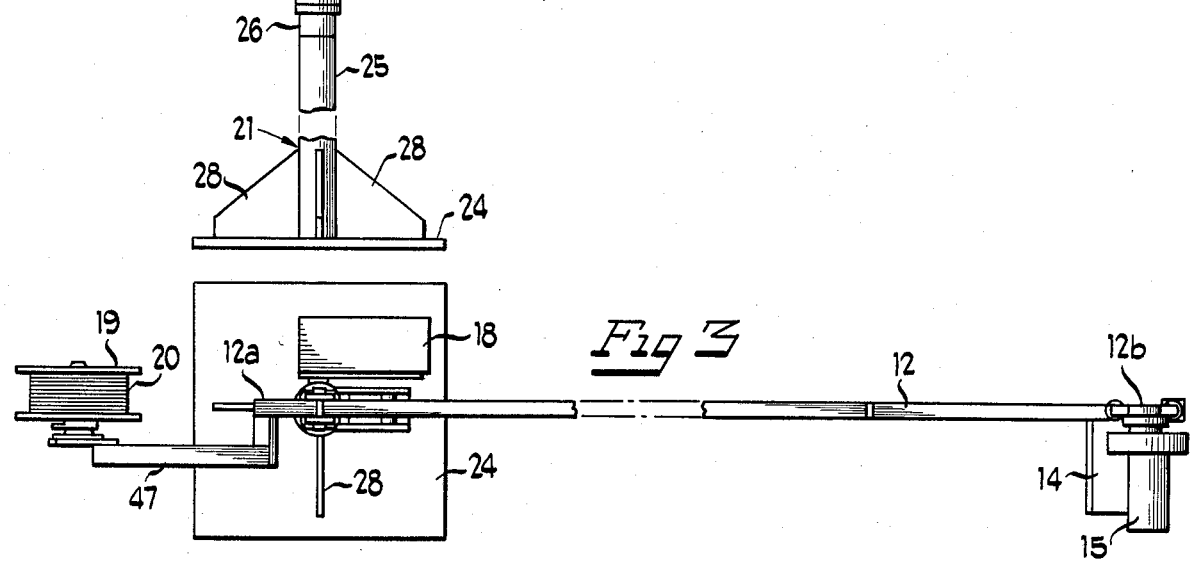
FIG. 3 is a top plan view of the boom apparatus of FIG. 1.

As shown in FIG. 3, an angle bracket 47 is welded to the boom 12 at its proximal end 12a and the wire feed spool 19 is carried by the rearwardly projecting arm of the angle bracket 47. Direct attachment of the wire feed spool 19 to the boom enables welding wire 20 to be fed in a straight line. Wire feed cable and wires run inside the boom 12. The welding support structure 14, including the wire feed motor 15, are mounted on the boom 12 at its distal end 12b and movable therewith as the boom 12 is pivoted up and down.

Referring again to FIG. 5, the boom 12 is positioned between the side members 39 and 40 of the mounting bracket 35 with the axial bore 45 of the mounting bushing 44 aligned with the mounting holes 41 and 42 provided in the side members 39 and 40. The shank of the bolt 36 extends through the mounting holes 41 and 42 and the bore 45, defining the pivot axis for the boom 12. The bolt 36 is held in place by the nut 37. In accordance with a feature of the invention, the bolt 36 and nut 37 are the only means required to secure the boom 12 to the floor stand 11. This greatly simplifies assembly of the boom apparatus 10 during installation, as well as disassembly for maintenance purposes. The floating mount of support post 22 on the base assembly 21 allows the boom 12 to be rotated through 360°.

Referring now to FIGS. 4 and 5, the balancing mechanism 13 includes a spring bias assembly 50, a spring force coupling mechanism 51 and a locking mechanism 52. The spring bias assembly 50, which provides the force for counteracting the effect of gravitational forces on the boom 12, includes a vertically extending helical spring 53, and a spring support and enclosure 54 formed by a fixed collar 55, a fixed cover 56, a movable cover 57 and a movable collar 58. The spring support and enclosure 54 defines a compartment 59 for the spring 53. Collar 55 has a bottom surface 60 and a top surface 61. Cover 56 and cover 57 have respective mounting edges 62 and 63. Collar 58 has a bottom surface 64 and a top surface 65.

The spring force coupling mechanism 51, which couples the spring force to the boom 12, includes a movable sleeve 66 having an aperture 67 and having a pair of parallel lateral extensions 68 and 69 which define respective cam members 70 and 71, and a cam follower 72. Each extension, such as extension 68, is a plate-like member having an inner edge 73 (see FIG. 6), an outer edge 74, a top edge 75 and a bottom edge 76. Each cam member, such as cam member 70, is in the shape of a rectangular prism having an upper surface 77, a side surface 78, an inner edge 79 and an outer edge 80. The cam follower 72 comprises a pair of rollers 81 and 82 carried by an axle 83.

The locking mechanism 52, shown best in FIGS. 4 and 6, includes a housing 87, a locking pin 88 and a bias spring 89. The housing 87 is in the form of a cylinder which is open at one end 90 and has a head portion 91 closing the housing 87 at its other end 92. An axial bore 93 formed through the head portion 91 communicates with the inner cavity 94 of the housing 87. An arcuate cutout defines a detent 95 (FIG. 6) is formed on the top outer surface 96 of the head portion 91 of the housing 87. The locking pin 88 has a handle 97, a shank 98, an index fin 99, a spring retainer 100 and a tip 101.

Considering the spring bias assembly 50 in more detail, with reference to FIG. 4, the fixed collar 55 rests on the mounting sleeve 26 and is attached to the mounting sleeve 26 as by welding. The helical spring 53 encircles the support post 22 and is supported at its lower end by the fixed collar 55 and in turn supports the movable collar 58 on its upper end. Thus, the spring 53 is located between the fixed collar 55 and the movable collar 58, and urges the movable collar 58 vertically upwardly.

Fixed cover 56 and movable cover 57 are generally cylindrical in shape and are mounted together overlying the upper portion of the support post 22. The covers 56 and 57 are located between the fixed collar 55 and the movable collar 58 to enclose the bias spring 53 within the compartment 59 which extends axially of the support post 22. More specifically, the fixed cover 56 has its mounting edge 62 welded to the fixed collar 55 and extends upwardly therefrom. The movable cover 57 has its mounting edge 63 welded to the movable collar 58 and extends downwardly therefrom, receiving the upper portion of the fixed cover 56 in telescopic engagement, allowing vertical sliding movement of the movable cover 57 along the upper portion of the fixed cover 56.

Turning now to the force coupling mechanism 51, with reference to FIGS. 4 and 5, the movable sleeve 66 is slidably mounted on the support post 22 and is carried by the movable collar 58. The movable sleeve 66 is attached to the top edge 65 of the movable collar 58 such as by welding. Each of the plate-like extensions, such as extension 68, has its inner edge 73 welded to the movable sleeve 66 on opposite sides. Cam member 70 has its side surface 78 welded to the inner side of the extension 68 near its top edge 75. The cam member 70 extends horizontally from the outer edge 74 of extension 68 towards the inner edge 73 of the extension 68. Extension 69 is similar in structure to extension 68, but a mirror image thereof, with its associated cam member 71 inwardly directed to oppose cam member 70 and aligned therewith as shown in FIG. 5.

The axle 83 which carries the two rollers 81 and 82 is attached to the underside of the boom 12. The rollers 81 and 82 are secured to the axle 83 in a manner which enables the rollers 81 and 82 to revolve freely on the axle 83 and thus roll along the cam surfaces as the boom 12 is pivoted. Roller 81 rides on the upper surface of cam member 70 and roller 82 rides on the upper surface of cam member 71.

The spring 53 biases the spring force coupling mechanism 51, including the movable sleeve 66 and the extensions 68 and 69, upwardly, maintaining the inwardly directed cam members 70 and 71 in engagement with the rollers 81 and 82, respectively. The spring 53 is compressed over a fraction, say one-fourth, of its extent when the boom 12 is in a horizontal position to provide sufficient upward force to counteract gravitational forces on the boom 12 and its load when the boom 12 is extending horizontally, as well as when the end of the boom is raised above the horizontal position. The spring force is directed along a force axis which extends coaxially of the support post 22.

The force coupling mechanism 51, effectively defines a lever arm which translates the spring force laterally, and applies the force, multiplied by the length of the lever arm, to the underside of the boom 12 along the line of attachment of axle 83 to the boom 12. The spring force is applied to the boom 12 at a location between the pivot axis and the distal end 12b of the boom 12. The length of the lever arm is defined by the distance L between the axis of the support post 22 and the axle 83 (FIGS. 7 and 8). As the boom 12 is pivoted down, the movable sleeve 66 and the extensions 68 and 69 are moved down, against the force of the spring 53, and the rollers 81 and 82 move toward the support post 22, shortening the length of the lever arm. As the boom 12 is pivoted up, the spring 53 moves the movable sleeve 66 and the extensions 68 and 69 upwardly, and the rollers 81 and 82 move away from the support post 22, increasing the length of the lever arm. Although the distance L varies as the boom 12 is raised or lowered, the distance P between the pivot axis, at bolt 36, and the axle 83 remains fixed.

The locking mechanism 52 enables the boom 12 to be locked in a horizontal position when the tip 101 of the locking pin 88 is located in the aperture 32 of support post 22, or locked in raised or lowered positions relative to the horizontal position when locking pin 88 engages aperture 31 or aperture 33, respectively. With reference to FIGS. 4 and 6, the housing 87 extends horizontally and is welded to the movable sleeve 66 at its open end 90. The shank 98 of the locking pin 88 extends through the axial bore 93 of the housing 87 with the tip 101 of the locking pin 88 passing through the aperture 67 in the movable sleeve 66 and the aperture 32 in the support post 22. The bias spring 89 encircles the shank 98 of the locking pin 88 and is located between the spring retainer 100 and the inner surface of the head portion 91 of the housing 87, biasing the tip 101 of the locking pin 88 inwardly towards the support post 22, maintaining the locking pin 88 engaging the aperture 67 in the movable sleeve 66 and the aperture 32 in the support post 22 (FIG. 4). This prevents movement of the sleeve 66 relative to the support post 22 and thus locks the boom 12 in the horizontal position.

The boom 12 is unlocked by drawing the locking pin 88 outwardly against the force of the bias spring 89 to move the tip 101 out of engagement with aperture 32 and aperture 67, allowing the sleeve 66 to move up or down on the support post 22. When retracted, index fin 99 is disengaged from the detent 95, and can be rotated a quarter turn so that upon release of the locking pin 88, the index fin 99 will engage the forward surface of the housing 87, maintaining the locking pin 88 its retracted position so that the boom 12 can be raised or lowered to any position desired.

In FIG. 4, the locking mechanism 52 as depicted maintains the boom 12 locked in a generally horizontal position. The rollers 81 and 82 are located near the centers of the cam members 70 and 71, respectively. To lower the boom 12, the locking pin 88 is retracted, freeing the movable sleeve 66 to move relative to the support post 22. Then while retracted, the locking pin 88 is rotated a quarter-turn to locate the index fin 99 away from the detent 95.

Then, the distal end 12b of the boom 12 is pivoted down, pushing the extensions 68 and 69, and the movable sleeve 66 downwardly against the force of the spring 53. This compresses the spring 53, increasing the spring force which is directed upwardly along the force axis. As extensions 68 and 69 move down, the rollers 81 and 82 move inwardly (to the left as illustrated for roller 81 in FIG. 7), toward the force axis defined by the axial center line of the support post 22. The distance P between the pivot axis and the axle 83 remains constant. However, as the boom 12 is pivoting downwardly, the line of application of the force to the boom is moved closer to the line of force of the spring. Consequently, the effective length of the lever arm is shortened, thereby compensating for the increased spring force applied due to compression of the spring 53 as the end of the boom 12 is lowered.

When the distal end 12b of the boom 12 is raised from the horizontal position illustrated in FIG. 4, the force coupling mechanism 51 is moved vertically upwardly by the spring force, which decreases as the force coupling mechanism 51 moves up. The rollers 81 and 82 move outwardly (to the right as illustrated for roller 81 in FIG. 8) as the cam members 70 and 71 move up. Once again, the distance P between the pivot axis and the line of application of the force to the boom 12 remains constant, but the pivoting upwardly of the boom 12 moves the line of application of the force further away from the force axis. This effectively increases the length of the lever arm, thereby compensating for the decrease in the spring force as the end of the boom 12 is raised.

Although the specific embodiment depicted in the drawings and described above has a cam member 70 which is arranged horizontally, it is to be understood that the cam member can slant upwardly or downwardly, or may even curve. Such variation in the orientation or configuration of the cam member 70 may be desirable to refine the self-balancing capability of the boom 12. Furthermore, although the self-balancing boom has been described as being particularly useful to carry welding equipment, it is clear that the boom could carry any equipment or tools or even a human being.

I claim:

1. A self-balancing boom apparatus comprising a vertically extending support member, a boom pivotally mounted near its proximal end to said support member for movement about a pivot axis, and adapted to carry a load at its distal end, and balancing means for counteracting downward force at the distal end of said boom and including spring means and spring force coupling means, said spring means being carried by said support member and producing a force which is directed along a force axis which is fixed with respect to said support member, said spring force coupling means being constructed and arranged to apply the spring force to said boom at a point located between the pivot axis and the distal end of said boom in a predetermined fixed direction, and to maintain substantially constant the moment of the force exerted on said boom by said spring as said boom is pivoted.

2. Apparatus according to claim 1, wherein the force axis extends in a vertical direction and the force produced by said spring means along the force axis varies as said boom is pivoted, said spring force coupling means including means defining a lever arm extending normal to the force axis for applying the spring force to said boom and the effective length of said lever arm varying inversely with the spring force as said boom is pivoted.

3. Apparatus according to claim 1, wherein the distance between the pivot axis and the point of application of the spring force remaining constant as the distal end of said boom is raised or lowered.

4. Apparatus according to claim 3, wherein said spring force coupling means comprises a guide portion mounted on said support member for vertical movement thereon and having an extension portion defining said lever arm, said spring means being disposed beneath said guide portion urging it upwardly to maintain said lever arm in engagement with said boom.

5. Apparatus according to claim 4, wherein said support member includes a tubular portion, said spring means extending vertically within said tubular portion, and said guide portion being in the form of encircling said tubular portion and movable therealong to compress said spring means as the distal end of said boom is lowered, said spring means extending, driving said guide portion upward, as the distal end of said boom is raised.

6. Apparatus according to claim 5, which further comprises locking means manually operable to connect said guide portion to said support member to thereby prevent vertical movement of said guide portion relative to said support member whereby said boom is maintained locked in a given position.

7. Apparatus according to claim 1, further comprising a pivot rod assembly attaching said boom to said support member and defining said pivot axis, said pivot rod assembly being the sole means of connection between said boom and said support member.

8. Apparatus according to claim 1, wherein said predetermined fixed direction is parallel to said force axis.

9. Apparatus according to claim 8, wherein said predetermined fixed direction is vertical.

10. A self-balancing boom apparatus comprising a vertically extending support member, a boom pivotally mounted near its proximal end to said support member for movement about a pivot axis, and adapted to carry a load at its distal end, and balancing means for counteracting downward force at the distal end of said boom and including spring means and spring force coupling means, said spring means being carried by said support member and producing a force which is directed along a force axis, said spring force coupling means being constructed and arranged to apply the spring force to said boom at a point located between the pivot axis and the distal end of said boom, said spring force coupling means including a cam member and a cam follower, said cam member being coupled to said spring means and defining a cam surface, said cam follower being fixed to said boom at the point of application of the spring force and engaging said cam surface, said cam member being movable relative to said support member as said boom is pivoted to vary the force produced by said spring along the force axis while cooperating with said cam follower to vary the distance between the force axis and the point of application of the spring force to said boom whereby the moment of the force exerted on said boom by said spring means is maintained substantially constant as said boom is pivoted.

11. Apparatus according to claim 10, wherein the force axis extends in a vertical direction and said cam surface extends in a direction normal to said force axis, said cam member defining a lever arm for applying the spring force to said boom, the effective length of the lever arm being defined by the distance between the force axis and the point at which said cam follower engages said cam surface, and the effective length of the lever arm varying inversely with the spring force as said boom is pivoted.

12. Apparatus according to claim 11, wherein said cam member is moved in a vertical direction and said cam follower engages and moves along said cam surface as said boom is pivoted, whereby said cam member directs said cam follower along an arcuate path extending a constant distance from said pivot axis enabling the length of the lever arm to vary as the distal end of said boom is raised or lowered.

13. Apparatus according to claim 10, wherein said cam member directs said cam follower towards the force axis as the distal end of said boom is lowered, and directs said cam follower means away from the spring force axis as the distal end of said boom is raised, the distance between the pivot axis and the point of application of the spring force remaining constant as the distal end of said boom is raised or lowered.

14. Apparatus according to claim 13, wherein said support member includes a tubular portion, said spring means extending vertically within said tubular portion, and wherein said cam member includes a guide portion and an extension portion with said cam surface extending horizontally therealong, said guide portion encircling said tubular portion and movable vertically therealong to compress the spring as the distal end of said boom is lowered, said spring extending, driving said sleeve portion upward, as the distal end of said boom is raised.

15. Apparatus according to claim 14, wherein said extension portion defines a pair of cam surfaces which extend horizontally in a parallel spaced relationship, and said cam follower comprises a pair of rollers each rotatably secured to said boom at the point of application of the spring force and each adapted to roll along one of said cam surfaces as said boom is pivoted.

16. In a self-balancing boom apparatus including a vertically extending support member and a boom pivotally mounted near its proximal end to the support member for movement about a pivot axis, and adapted to carry a load at its distal end, balancing means for counteracting downward force at the distal end of the boom, said balancing means comprising spring means and force coupling means, said spring means being carried by the support member for producing a force which is directed along a force axis which is fixed with respect to the support member, said spring force coupling means being constructed and arranged to apply the spring force to the boom at a point located between the pivot axis and the distal end of the boom in a predetermined fixed direction, to maintain substantially constant the moment of the force exerted on the boom by said spring means as the boom is pivoted.

17. Apparatus according to claim 16, wherein the force axis extends in a vertical direction and the force produced by said spring means along the force axis varies as the boom is pivoted, said spring force coupling means including means defining a lever arm extending normal to the force axis for applying the spring force to the boom, the effective length of said lever arm varying inversely with the spring force as the boom is pivoted.

18. Apparatus according to claim 17, wherein said spring force coupling means comprises a cam member and a cam follower, said cam member being coupled to said spring means and defining a cam surface, and said cam follower being fixed to the boom at the point of application of the spring force and engaging said cam surface, said cam member being movable relative to the support member as the boom is pivoted to vary the force produced by said spring along the fixed spring force axis, while cooperating with said cam follower to vary the distance between the spring force axis and the point of application of the spring force to the boom.

19. Apparatus according to claim 18, wherein the distance between the pivot axis and the point of application of the spring force remains constant as the distal end of the boom is raised or lowered.

20. Apparatus according to claim 19, wherein said cam member is moved in a vertical direction and said cam follower engages and moves along said cam surface as the boom is pivoted, whereby said cam member directs said cam follower along an arcuate path extending a constant distance from said pivot axis enabling the length of the lever arm to vary as the distal end of the boom is raised or lowered.

21. Apparatus according to claim 20, wherein said cam surface extends generally horizontally, said cam follower being moved along said cam surface in a direction away from the support member as the distal end of the boom is raised, thereby increasing the distance between the spring force axis and the point of application of the spring force, and said cam follower being moved along said cam surface toward the support member as the distal end of the boom is lowered, thereby decreasing the distance between the spring force axis and the point of application of the spring force.

22. Apparatus according to the claim 21, wherein said spring means extends vertically within the support member, said spring force coupling means comprising a guide portion mounted on the support member for vertical movement thereon and having an extension portion defining said lever arm, said guide means compressing said spring means as the distal end of the boom is lowered, and said spring means extending, driving said guide portion upwardly as the distal end of the boom is raised.

* * * * *